Jan. 1, 1935.  F. H. KAYLER  1,986,400

COUPLER

Filed March 6, 1929  4 Sheets-Sheet 1

Inventor:
Frank H. Kayler.

Jan. 1, 1935.  F. H. KAYLER  1,986,400
COUPLER
Filed March 6, 1929  4 Sheets-Sheet 2
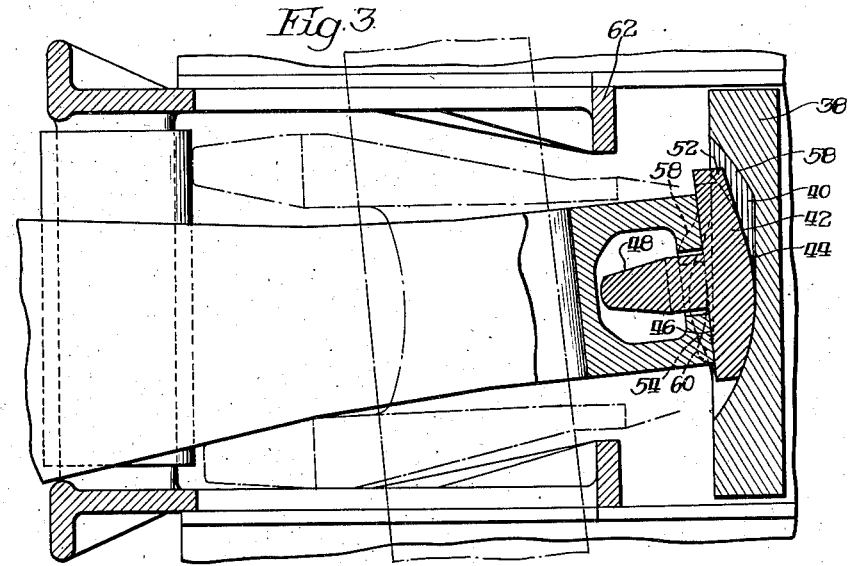
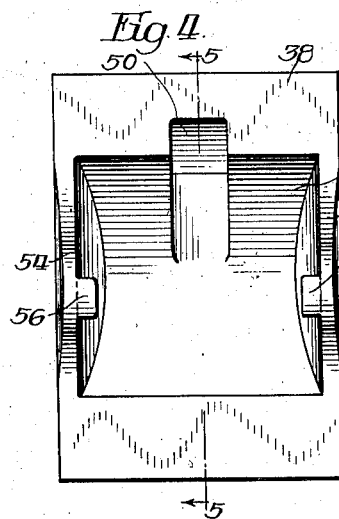
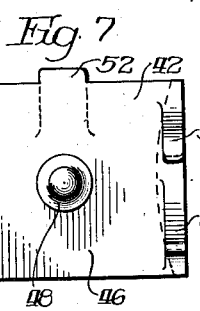
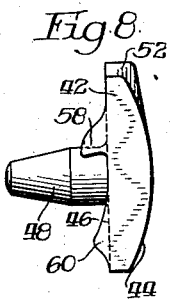
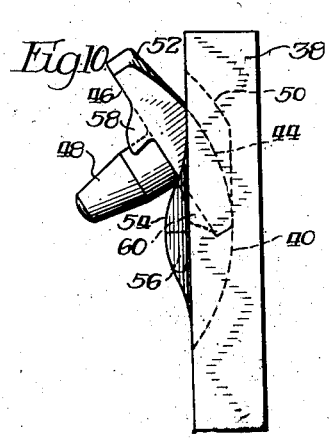
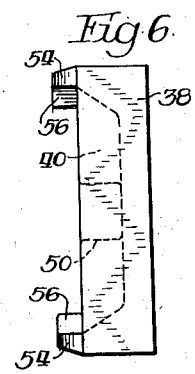
Inventor:
Frank H. Kayler Jan. 1, 1935.  F. H. KAYLER  1,986,400
COUPLER
Filed March 6, 1929  4 Sheets-Sheet 3
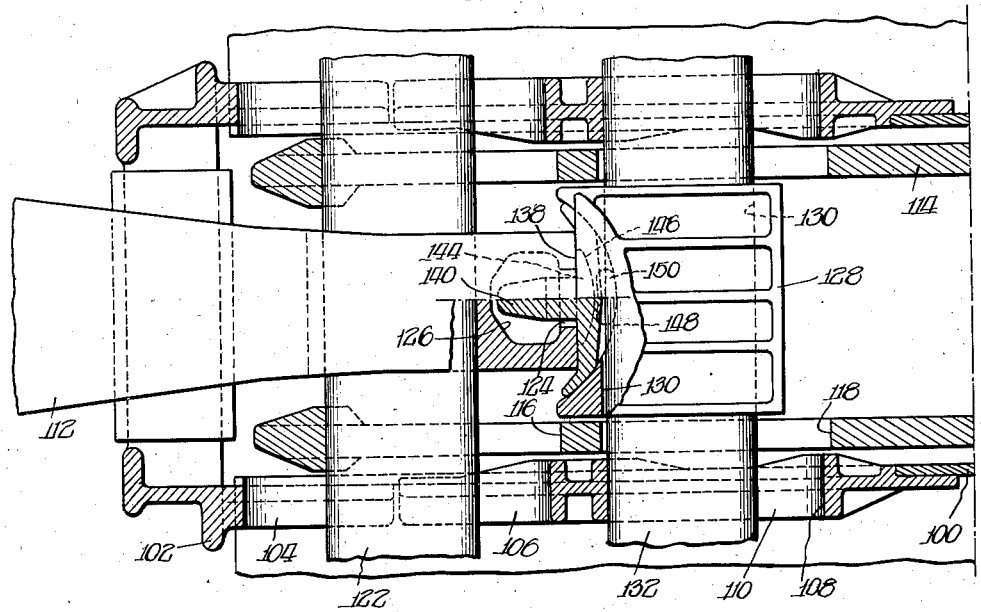
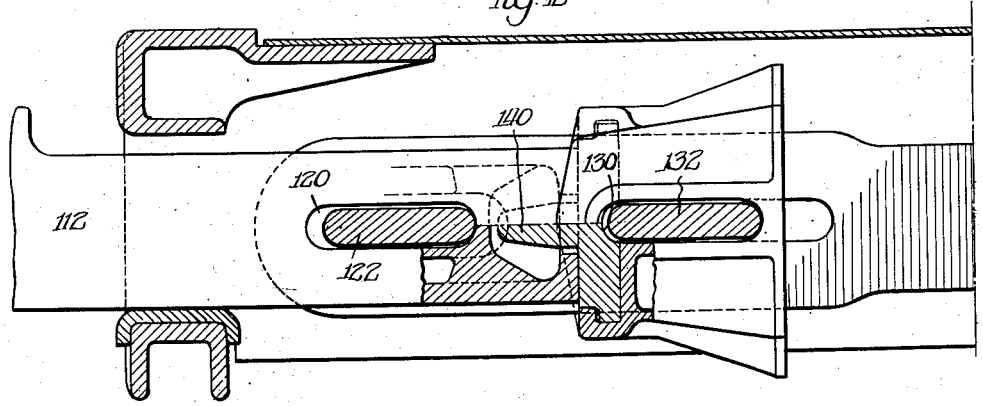
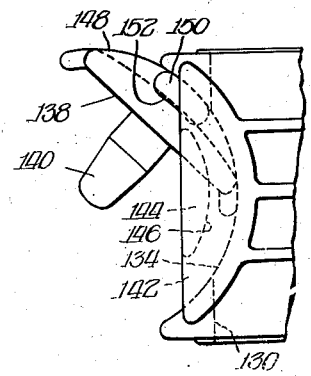
Inventor:
Frank H. Kayler, Jan. 1, 1935.  F. H. KAYLER  1,986,400
COUPLER
Filed March 6, 1929  4 Sheets-Sheet 4
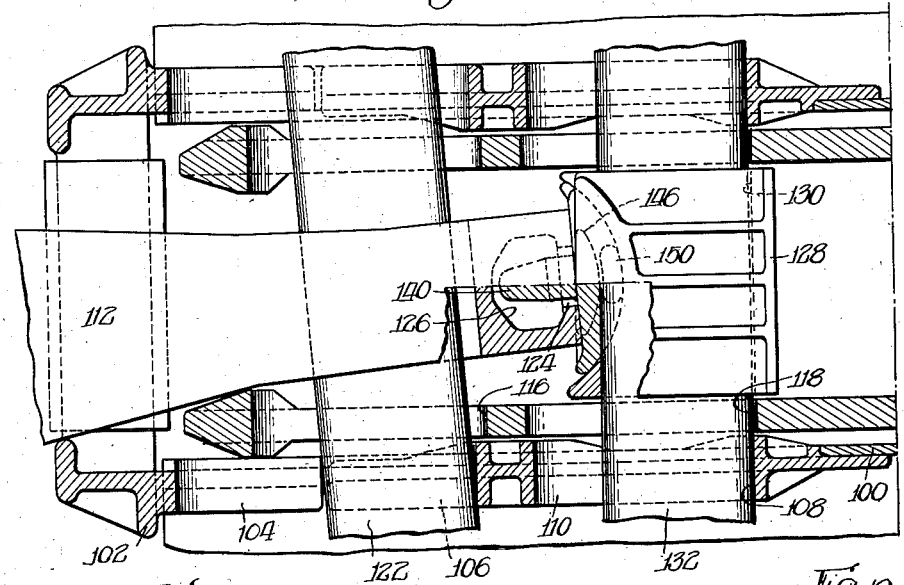
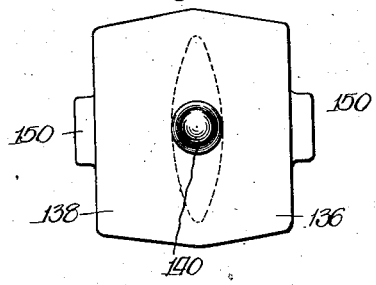
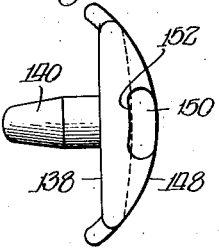
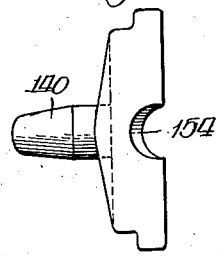
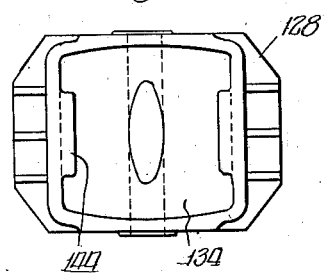
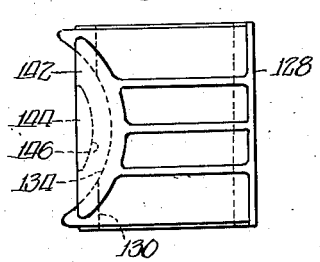
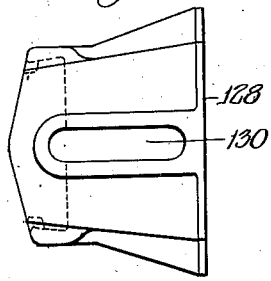
Inventor:
Frank H. Kayler Patented Jan. 1, 1935

1,986,400

UNITED STATES PATENT OFFICE 1,986,400

COUPLER

Frank H. Kayler, Alliance, Ohio, assignor to American Steel Foundries, Chicago, Ill., a corporation of New Jersey Application March 6, 1929, Serial No. 344,880

33 Claims. (Cl. 213—69)

This invention pertains to new and useful improvements in draft rigging, wherein an embodiment of the device is illustrated as being in the nature of a radial buff bearing for the coupler butt.

An object of this invention is to provide a draft device of great simplicity, strength and compactness of structure, which fulfills all requirements of service and manufacture, and eliminates maintenance costs, such as are attendant upon the use of tail pins, nuts, cotters and blocks commonly employed in connection of couplers to their draft yokes.

Another object is to provide a construction in which the coupler may angle freely regardless of the compression in the draft gear to thereby permit coupling on curves without delay or effort, and in order to eliminate transmission of the side movement of the coupler key to thereby avoid wear of the key and keyways and to prevent any blows on the cotter or other key fasteners.

Still another object is to provide coupler mechanism having a buffing piece separate from the coupler shank, permitting designing of the coupler structure to secure maximum strength in buffing areas to resist compressive stresses in such construction, whereby recesses in the coupler butt are used to cooperate with small attaching lips on a radial butt piece which may become broken off in service and result in loss of the swivel, which may be eliminated.

Yet another object is to provide a draft rigging adapted for use with the standard A. R. A. coupler which functions as a swivel coupler, which however is used with a conventional type of yoke and draft gear.

A further object is to provide a coupler arrangement which performs in the nature of a swivel butt coupler and provides substantially full bearing in buff, and one which transmits stresses of buff directly without distortion regardless of the position of the coupler.

A still further object is to provide a draft appliance in the nature of a swivel butt coupler which is used in conjunction with the standard A. R. A. type of coupler and which may be used with the conventional type of yoke and draft gear, or with the Farlow arrangement, provisions being made for the utilization of the round prong usually found on a front follower in such an arrangement.

A different object is to provide a draft assembly embodying all the advantages of a swivel butt arrangement with any type of draft gear, the parts forming the swivel butt being of the same dimensions as the part replaced on the other types of draft gear.

Still different object is to provide a draft assembly whereby the bearing block and follower forming a swivel butt arrangement with the coupler are of such size as to readily replace the standard follower without otherwise affecting the remainder of the draft assembly.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 3 is a fragmentary sectional top plan view of the parts of the device illustrated in Figure 1, showing the same in angled buff position;

Figure 4 is a front view of the front follower plate;

Figure 5 is a view in cross-section of the follower plate illustrated in Figure 4, the same being taken substantially in the plane as indicated by the line 5—5 of Figure 4;

Figure 6 is an end elevation of the follower plate illustrated in Figure 4;

Figure 7 is a front view of the buffing piece;

Figure 8 is a top plan view of the buffing piece illustrated in Figure 7;

Figure 9 is an end elevation of the buffing piece illustrated in Figure 7;

Figure 10 is a top plan view illustrating the method of assembling the follower and bearing plate illustrated in Figures 4 to 9 inclusive;

Figure 11 is a fragmentary sectional plan showing the relation between the draft sills, coupler butt and draft appliance of a modified form of the invention, parts being in normal position;

Figure 12 is a fragmentary sectional elevation of the draft mechanism illustrated in Figure 11;

Figure 13 is a fragmentary sectional top plan view of the parts of the device illustrated in Figure 11, showing the same in angled buff position;

Figure 14 is a front view of the front follower used in the modified form of draft appliance illustrated in Figure 11;

Figure 15 is a top plan view of the follower illustrated in Figure 14;

Figure 16 is a side elevation of the follower illustrated in Figure 14;

Figure 17 is a front view of the buffing piece used in the modified form of draft appliance illustrated in Figure 11;

Figure 18 is a top plan view of the buffing piece illustrated in Figure 17;

Figure 19 is a view in side elevation of the buffing piece illustrated in Figure 17; and Figure 20 is a top plan view illustrating the method of assembling the follower and the bearing plate particularly illustrated in Figures 14 to 19 inclusive.

Figure 1:
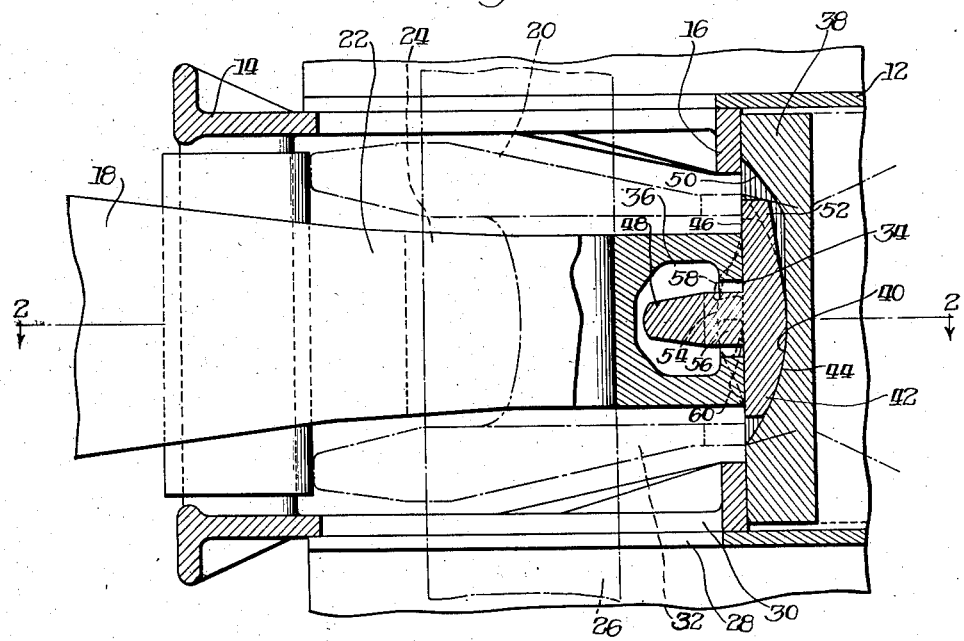
Figure 1 is a fragmentary sectional plan showing the relation between the draft sills, coupler butt and draft appliance embodying the invention, showing the parts in normal position.
Figure 2:
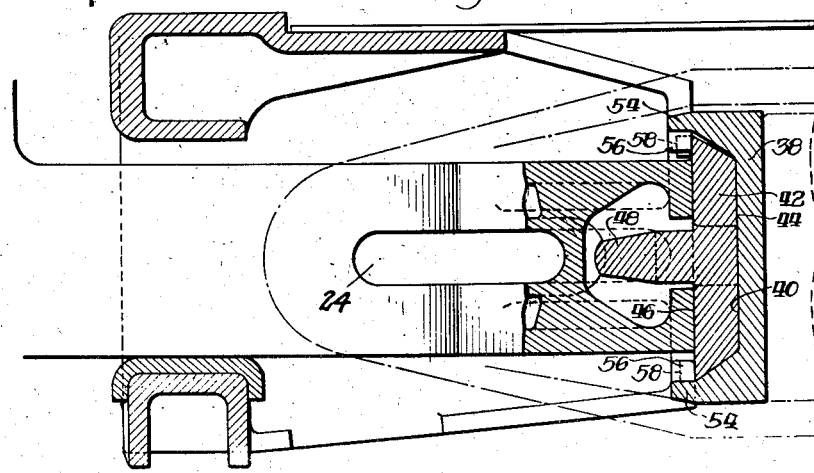
Figure 2 is a fragmentary sectional elevation of the draft mechanism illustrated in Figure 1, the same being taken substantially in the plane as indicated by the line 2—2 of Figure 1.

Referring first of all more particularly to the assembly of the draft appliance illustrated in Figures 1 to 3 inclusive, the draft sills 12 are provided with a striker casting 14 secured thereto in any convenient manner, said casting being preferably provided with the front follower stops 16. In the device illustrated, the assembly shows the standard A. R. A. type D coupler 18, and an A. R. A. design of vertical yoke 20. As shown, the coupler shank 22 is provided with a horizontal keyway 24 adapted to receive the horizontal key 26 extending through keyways 28, 30 and 32 provided in the side sills, striker casting and yoke jaws respectively. The coupler butt is of the so-called Farlow type, provided with an aperture 34 communicating with the pocket 36 for the accommodation of the usual forwardly extending follower prong found on the front follower.

The yoke of course accommodates the usual draft gear found between the front and rear followers, which followers cooperate with the stops provided on the center sills, in the present invention the usual form of front follower being replaced with the follower casting 38 provided with the arcuate socket or surface 40 into which is fitted a radial buffing piece 42, the rear face 44 of which is of a arcuate form, having cooperative engagement with the arcuate socket in the main follower casting. The front face 46 of the buffing piece is flat, being adapted for cooperation with the flat butt end of the coupler, and in the case where a Farlow type of coupler is used, the buffing piece is provided with a forwardly extending prong 48 adapted to fit in the aperture 34 and the pocket 36 in the coupler butt. The main follower casting is provided with a channeled portion 50 communicating with the arcuate portion 40, being adapted for the reception of the lug 52 provided on and communicating with the arcuate surface 44 of the buffing piece. The follower block is also provided with upstanding extensions or ribs 54 provided on either side of the arcuate surface 40, said extensions serving to support inwardly extending lugs 56 and also serving as reinforcements in the center of the follower. The buffing piece is provided with spaced lugs 58 and 60, said lugs being adapted to have cooperative engagement with lugs 56 for limiting the angular movement between the follower casting and buffing piece.

The assembling of the follower casting and buffing piece is preferably done before the follower is assembled with the yoke, and this is accomplished, as illustrated in Figure 10, by entering the block along the arc of the radial surfaces from one side, that of the largest opening as limited by lugs 56. This causes the lugs 60 of the buffing piece to pass beneath and to one side of the lugs 56, and in normal assembled position, the buffing piece is retained in place in the follower by being between the coupler butt and the follower and by interference between the lugs 56 and 60. Under buffing action, the buffing piece is of course retained in place by pressure of the coupler butt. Under pulling action when the coupler butt is pulled forward and away from the follower, the buffing piece is retained against forward movement by interference between the lugs 56 and 60 or face 46 and the lugs 56. It is also retained sideways in certain limits in one direction by interference between the lugs 58 and lugs 56, and in the opposite direction by interference between the lug 52 and the striker casting follower stop 62. Thus it will be seen that once the buffing piece is assembled with the follower, and the same assembled into operative relation with the yoke, the coupler draft gear and car follower stops, it can never become misplaced. Under buffing action then, the load is carried direct from the buffing piece through the follower to the draft gear, the follower not being subject to bending stresses.

In pulling action, there is of course no stress on the radial buffing piece when used with the gear having a front end of approximately the same dimension as the follower, there being practically no bending stresses on the follower. When used with a gear with a narrow front end, there would be some bending stresses imposed upon the follower, but inasmuch as such gears are of full height, the recessing of the center of the follower to take the buffing piece would not materially weaken its resistance to draft gear pressure, especially as the reinforcing ribs 54 are provided at the top and bottom at center. The material used in the follower will be of much higher tensile strength than that of present standard followers of railroad steel. In buffing, it will be seen that the buffing piece radially angles and provides a maximum bearing area between the coupler shank and the front follower within the extreme limits of angling of the coupler.

Referring now to the assembly of the draft appliance illustrated in Figures 11 to 13 inclusive, which pertains particularly to assemblies of the Farlow type, the draft sills 100 are provided with a striker casting 102 secured thereto in any convenient manner, said casting being preferably provided with portions 104 forming a part of the front keyways 106. The draft sills are also provided with cheek plates 108 providing rear keyways 110 and forming the rear portion of the forward keyways 106 cooperating with the striker casting 102, it being understood that keyways 110 and 106 on opposite sides of the sills 100 are aligned.

The assembly illustrated employs the standard A. R. A. coupler 112 and a horizontal plane Farlow yoke 114, said yoke being provided with front and rear spaced keyways 116 and 118 adapted to register with keyways 106 and 110. The coupler shank is provided with a horizontal keyway 120 adapted to receive the horizontal key 122 extending through keyways 106 and 116 provided in the side sills by the striker casting and cheek plates and in the yoke. The coupler butt is of the Farlow type, provided with the aperture 124 communicating with a pocket 126 for accommodation of the usual forwardly extending follower prong found on the front follower. The yoke 114 of course accommodates the usual draft gear found in the Farlow arrangement, the front follower of which is replaced by follower 128 provided with a keyway 130 adapted to accommodate the key 132 passing through keyways 110 and 118. The follower 128 is provided with an arcuate surface 134 on its forward side, and into this pocket is fitted a radial buffing piece 136 having a complementary arcuate surface having cooperative engagement with the arcuate surface 134. The buffing piece 136 is provided with a flat surface 138 adapted for cooperation with the flat butt end of the coupler, and in this case, is provided with a forwardly extending prong 140 adapted to fit within the aperture 124 and the pocket 126 in the coupler butt.
The follower 128, which is of the general Farlow type, is provided with the arcuate surface 134 which interrupts a portion of the keyway 130. Walls 142 are provided on each side of the arcuate surface, said walls having inwardly extending overhanging portions 144 also provided with arcuate surfaces 146, the walls 142 in effect forming a reinforcing rim with the upper and lower portions of the arcuate surface, such as shown in Figure 14. The buffing piece, as has been described, is provided with a complementary arcuate surface 148 adapted to have cooperative bearing engagement with the arcuate surface 134. The sides of the buffing piece are provided with outstanding lugs 150 adapted to fit under the lugs 144 and having an arcuate bearing surface 152 cooperating with the arcuate surface 146, and the buffing piece is also provided with a cut-out or channel portion 154 substantially arcuate shaped in its longitudinal dimension and adapted to accommodate the key 132 yet permit ready rotation of the piece with respect thereto, it being understood that the key 132 and the cooperation between the lugs 150 and 144 forms means for limiting the swiveling action between the buffing piece and the follower.
As in the case of the previous modification, the follower and buffing piece are of such proportions that their overall depth does not exceed the overall depth of the standard corresponding followers; therefore, these devices may be readily interchangeable with the ones now in use.
The assembling of the follower casting and buffing piece is preferably done before the follower is assembled with the yoke, and this is accomplished as illustrated in Figure 20 by sliding the buffing piece into its operative position where the outstanding lugs 150 engage under the lugs 144, the channel 154 being disposed to complete the keyway 130. The assembly may then be put in place with respect to the yoke and the key 132 may be disposed through the keyways 110, 118 and 130, locking the follower and buffing piece in operative position, whereupon the coupler 112 may be slid into place and secured by the key 122. In pulling action, there is of course no stress on the radial buffing piece as the coupler and forward key 122 will merely move forward to engage the front part of the keyway 106, the draft gear being pressed between the follower 128 and the rear portion of the yoke 114. In buff, however, the follower and buffing piece may be moved rearwardly to extreme position where the key 132 contacts the rear portion of the keyway 110, and in this position, or any intermediate position, the coupler 112 can swivel as illustrated in Figure 13, movement being between the buffing piece and the follower, and due to the arcuate surfaces provided, it will be seen that a maximum bearing area is provided between the coupler and the draft gear regardless of the angularity of the coupler to transmit stresses from the coupler to the draft gear over a maximum surface.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a draft appliance, the combination of supporting sills, stops provided thereon, draft gear disposed between said stops, said draft gear including a stop cooperating follower, said follower being provided with an arcuate surface and having lugs thereon, a coupler having a shank disposed between and loosely keyed to said sills, a buffing piece disposed between the butt of said shank and said follower and having an arcuate surface having cooperative engagement with said first named arcuate surface, said buffing piece having stops thereon adapted to cooperate with said first named stops and said lugs to limit the angular position of said buffing piece with respect to said follower.

2. In a draft appliance, the combination of supporting sills, stops provided thereon, draft gear disposed between said stops, said draft gear including a stop cooperating follower, said follower being provided with an arcuate surface, a coupler having a shank disposed between and loosely keyed to said sills, a buffing piece disposed between the butt of said shank and said follower and having an arcuate surface having cooperative engagement with said first named arcuate surface, said buffing piece being provided with means cooperating with one of said first named stops and with means on said follower to limit the angular position of said buffing piece with respect to said follower.

3. In a draft appliance, the combination of supporting sills, stops provided thereon, draft gear disposed between said stops, said draft gear including a stop cooperating follower, said follower being provided with an arcuate surface, a coupler having a shank disposed between and loosely keyed to said sills, a buffing piece disposed between the butt of said shank and said follower and having an arcuate surface having cooperative engagement with said first named arcuate surface, said follower being provided with means embracing said buffing piece and cooperating therewith to limit the angular position of said buffing piece with respect to said follower.

4. In a draft appliance, the combination of supporting sills, stops provided thereon, draft gear disposed between said stops, said draft gear including a stop cooperating follower, said follower being provided with an arcuate surface, a coupler having a shank disposed between and loosely keyed to said sills, a buffing piece disposed between the butt of said shank and said follower and having an arcuate surface having cooperative engagement with said first named arcuate surface, said follower having members embracing said buffing piece and cooperating with means thereon to limit the angular position of said buffing piece with respect to said follower.

5. In a draft appliance, the combination of supporting sills, stops provided thereon, draft gear disposed between said stops, said draft gear including a stop cooperating follower, said follower being provided with an arcuate surface, a coupler having a shank disposed between and loosely keyed to said sills, a buffing piece disposed between the butt of said shank and said follower and having an arcuate surface having cooperative engagement with said first named arcuate surface, said buffing piece being provided with a stop movable in a channel provided in said follower and adapted to cooperate with one of said first named stops to limit the angular position of said buffing piece with respect to said follower.

6. In a draft appliance, the combination of supporting sills, stops provided thereon, draft gear disposed between said stops, said draft gear including a stop cooperating follower, said follower being provided with an arcuate surface, a coupler having a shank disposed between and loosely keyed to said sills, a buffing piece disposed between the butt of said shank and said follower and having an arcuate surface having cooperative engagement with said first named arcuate surface, said buffing piece being provided with a stop movable in a channel provided in said follower and adapted to cooperate with one of said first named stops to limit the angular position of said buffing piece with respect to said follower in one direction, and members on said follower having cooperative engagement with members on said buffing piece to limit the angular position of said buffing piece with respect to said follower in another direction.

7. A follower having a flat rear surface and an arcuate front surface, members provided adjacent said arcuate surface having lugs overlapping said arcuate surface, said front face being provided with a channeled portion communicating with said arcuate surface.

8. In a draft appliance, the combination of a follower having a flat rear surface and an arcuate front surface, members provided adjacent said arcuate surface having lugs overlapping said arcuate surface, said front face being provided with a channeled portion communicating with said arcuate surface, a buffing piece having an arcuate rear surface adapted to have cooperative relation with the first named arcuate surface and provided with a lug adapted to move in said channel, and upstanding members provided on said buffing piece adapted to cooperate with said overlapping members to limit relative movement between said follower and buffing piece.

9. In a buffing piece, the combination of a body portion having an arcuate rear surface and a flat front surface, a prong extending laterally from said front surface, and limiting lugs provided on said front surface.

10. In a buffing piece, the combination of a body portion having an arcuate rear surface and a flat front surface, a prong extending laterally from said front surface, and pairs of upstanding limiting lugs provided on said front surface.

11. A buffing piece having a body portion formed with a flat coupler butt engaging surface and an arcuate bearing surface, spaced stop members disposed on said body portion for limiting movement thereof, and a stop disposed between said stop members and extending from said arcuate bearing surface.

12. A buffing piece having a body portion formed with a flat coupler butt engaging surface and a bearing surface, a plurality of spaced and aligned stop members disposed on each side of said body portion for limiting movement thereof, and a stop disposed between said stop members.

13. In a draft gear, the combination of a follower having an arcuate front surface, members provided adjacent said arcuate surface having lugs overhanging said arcuate surface, said follower being provided with a channeled portion communicating with said arcuate surface, and a buffing piece movable relative to said follower and having an arcuate surface cooperating with the arcuate surface thereof, said buffing piece being formed with elements engageable by said lugs for limiting said relative movement of said buffing piece.

14. A follower comprising a body portion having a rear draft gear engaging surface and being provided with a horizontally disposed key slot extending therethrough, said body portion being formed with a recess provided at the front thereof and having an arcuate surface interrupted by said opening.

15. A follower comprising a body portion having a rear draft gear engaging surface and being provided with a horizontally disposed key slot extending therethrough, said body portion being formed with a recess provided at the front thereof and having a surface interrupted by said opening, and members on said body portion provided adjacent and overhanging said surface.

16. In a draft gear, the combination of a follower formed with an arcuate surface, said follower having members spaced from said arcuate surface and having arcuate surfaces coaxially disposed therewith, and a buffing piece associated with said follower and having arcuate surfaces cooperating with the arcuate surfaces of said follower.

17. In a draft gear, the combination of a follower having an opening for a draft key, said follower being formed with a recess having an arcuate surface interrupted by said opening, said key having a portion projecting into said recess, said follower having members spaced from said arcuate surface and said members having arcuate surfaces coaxially disposed in relation to the arcuate surface on the follower, and a buffing piece having arcuate surfaces cooperating with the arcuate surfaces of said follower, said buffing piece having a key slot embracing said portion of said key.

18. In a draft appliance, the combination of a draft gear, said draft gear including a yoke, a movable follower, a buffing piece carried by said follower, said buffing piece and follower being provided with cooperative complementary arcuate surfaces providing substantially constant bearing surfaces between said follower and buffing piece, and a coupler connected to said yoke and movable with respect thereto, said coupler having cooperative engagement with said buffing piece whereby stresses may be transmitted to said follower through said piece.

19. A buffing piece having a body portion formed with a plane coupler butt engaging surface and an arcuate bearing surface, said arcuate bearing surface being provided with a cut-out portion forming a portion of a key slot.

20. A buffing piece having a body portion formed with a plane coupler butt engaging surface and an arcuate bearing surface, and means disposed on said body portion for limiting movement thereof, said arcuate bearing surface being provided with a cut-out portion forming a portion of a key slot.

21. In a draft gear, the combination of a follower, a coupler having a coupler shank, and a buffing piece between said shank and follower and being carried by the latter, said buffing piece and follower having cooperative complementary arcuate surfaces providing for substantially constant bearing surfaces for the transfer of buffing forces to said follower irrespective of the angling of said shank.

22. In a draft gear, the combination of a follower member, a coupler having a coupler shank member, and a buffing piece between said shank and follower, said coupler shank engaging with said buffing piece in buff and moving into spaced relation therewith when in draft, said buffing piece and follower having cooperative complementary arcuate surfaces providing substantially constant bearing surfaces for the transfer of buffing forces to said follower irrespective of the angling of said shank.

23. In a draft gear, the combination of a follower member, a coupler having a coupler shank member, a buffing piece between said shank and follower and carried by the latter, said coupler shank engaging with said buffing piece in buff and moving into spaced relation therewith when in draft, and means for holding said buffing piece in association with said follower when said coupler is in draft, said buffing piece and follower having cooperative complementary arcuate surfaces providing substantially constant bearing surfaces for the transfer of buffing forces to said follower irrespective of the angling of said shank.

24. In a draft appliance, the combination of a draft gear including a yoke, a movable follower, a buffing piece carried by said follower, said buffing piece and follower being provided with cooperative complementary arcuate surfaces providing substantially constant bearing surfaces between said follower and buffing piece, said follower having an opening therethrough interrupting the arcuate surface thereof, a key passing through said opening for support of said follower, said buffing piece having a slot embracing a portion of said key, and a coupler connected to said yoke and movable relative thereto, said coupler having cooperative engagement with said buffing piece whereby stresses may be transmitted to said follower through said piece.

25. In a draft gear, the combination of a follower comprising a body portion having an arcuate surface, members formed on said body portion and overhanging said surface, said members having arcuate surfaces coaxially disposed with relation to the arcuate surface of said body portion, and a buffing piece having arcuate surfaces cooperating with the arcuate surfaces of said follower.

26. A follower comprising a body portion having a rear draft gear engaging surface and being provided with a horizontally disposed key slot extending therethrough, said body portion having a front arcuate surface portion disposed forwardly of said opening and being interrupted thereby.

27. A follower comprising a body portion having a rear draft gear engaging surface and being provided with a horizontally disposed key slot extending therethrough, said body portion having a front arcuate surface portion disposed forwardly of said opening and being interrupted thereby, and members on said body portion provided adjacent and overhanging said arcuate surface.

28. In a draft gear, the combination of a follower formed with a recess having an arcuate buffing surface, and a buffing piece carried by said follower and extending into said recess and having an arcuate surface cooperating with the arcuate surface of said follower.

29. In a draft gear, the combination of a follower formed with a recess having an arcuate buffing surface, a buffing piece carried by said follower and extending into said recess and having an arcuate surface cooperating with the arcuate surface of said follower, and means for interlocking said follower and buffing piece.

30. In a draft gear, the combination of a follower formed with a recess having an arcuate buffing surface, said follower having parts overhanging said recess, and a buffing piece carried by said follower and extending into said recess and having an arcuate surface cooperating with the arcuate surface of said follower, said buffing piece being held in association with said follower by said parts.

31. In a draft gear, the combination of a follower having an arcuate front surface, members provided adjacent said arcuate surface having lugs overhanging said arcuate surface, said follower being provided with a channeled portion communicating with said arcuate surface, and a buffing piece provided with means interlocking with said lugs to hold the same in association with said follower and having an arcuate surface cooperating with the arcuate surface of said follower, said buffing piece having a part received in said channeled portion to prevent lateral displacement of the same relative to said follower.

32. In a draft gear, the combination of a follower having a slot therethrough, said follower being formed with a recess having a surface interrupted by said slot to provide an opening in said surface between the recess and slot, and a buffing piece in said recess and completing the wall of said slot where interrupted by said opening.

33. In a draft gear, the combination of a follower comprising a body portion having an opening therethrough, said portion being formed with an arcuate surface interrupted by said opening, members formed on said body portion and overhanging said surface, said members having arcuate surfaces coaxially disposed with relation to the arcuate surface of said body portion, a buffing piece having arcuate surfaces cooperating with the arcuate surfaces of said follower, said buffing piece having a part oppositely disposed to said interrupted surface portion of the follower to provide a key slot formed in part in said follower and in part in said buffing piece, and a key extending through said slot.

FRANK H. KAYLER.